United States Patent
Spertus (10) Patent No.: US 8,176,079 B1
(45) Date of Patent: May 8, 2012

(54) RESTRICTING ACCESS TO NETWORK RESOURCES THROUGH RECURSIVE URL CLASSIFICATION

(75) Inventor: Michael Spertus, Wilmette, IL (US)

(73) Assignee: Symantec Corporation, Mountain View, CA (US)

(*) Notice: Subject to any disclaimer, the term of this patent is extended or adjusted under 35 U.S.C. 154(b) by 775 days.

(21) Appl. No.: 12/236,388

(22) Filed: Sep. 23, 2008

(51) Int. Cl.
*G06F 17/30* (2006.01)

(52) U.S. Cl. ........................... 707/785; 709/217

(58) Field of Classification Search .......... 707/781–788; 709/217–224, 247
See application file for complete search history.

(56) References Cited

U.S. PATENT DOCUMENTS

| | | | |
|---|---|---|---|
| 2002/0010798 A1* | 1/2002 | Ben-Shaul et al. | 709/247 |
| 2002/0143932 A1* | 10/2002 | Quintero et al. | 709/224 |
| 2004/0031052 A1* | 2/2004 | Wannamaker et al. | 725/61 |
| 2006/0248094 A1* | 11/2006 | Andrews et al. | 707/100 |
| 2007/0208822 A1* | 9/2007 | Wang et al. | 709/217 |

* cited by examiner

*Primary Examiner* — Wilson Lee
(74) *Attorney, Agent, or Firm* — Advantedge Law Group (57) ABSTRACT

In one example, a server-based system may provide a recursive classification of the contents of a URL by: 1) receiving a request for a URL-classification list associated with a base URL, 2) constructing the URL-classification list, and 3) providing, in response to the request, the URL-classification list. The resulting URL-classification list may comprise: 1) content categories occurring in the base URL and 2) content categories occurring in any URLs embedded in the base URL. In another example, a client-based system may restrict access to network resources, based on the contents of a base URL, by: 1) identifying a request from a user to access a base URL, 2) requesting a URL-classification list associated with the base URL, 3) receiving the URL-classification list, and 4) determining, based on the URL-classification list, that access to the base URL is authorized. Corresponding computer-readable media are also disclosed.

19 Claims, 9 Drawing Sheets

| Content Categories for http://base-url.com |
| --- |
| 510 |
| Government<br>News<br>Science<br>Sports |

| Content Categories for http://embedded-level-1.com |
| --- |
| 520 |
| Innocuous Ads |

| Content Categories for http://embedded-level-2.com |
| --- |
| 530 |
| News<br>Science<br>Academic |

| URL-Classification List for http://base-url.com, depth 1 |
| --- |
| 550 |
| Government<br>News<br>Science<br>Sports<br>Innocuous Ads |

| URL-Classification List for http://base-url.com, depth 2 |
| --- |
| 560 |
| Government<br>News<br>Science<br>Sports<br>Innocuous Ads<br>Academic |

| URL-Classification List for https://base-url.com | |
| --- | --- |
| 590 | |
| 412  http://base-url.com | Government, News, Science, Sports |
| 422  http://embedded-level-1.com | Innocuous Ads |
| 432  http://embedded-level-2.com | News, Science, Academic |

RESTRICTING ACCESS TO NETWORK RESOURCES THROUGH RECURSIVE URL CLASSIFICATION

BACKGROUND

Global networks, especially the Internet, make a vast amount of information easily accessible. Unfortunately, the Internet contains a significant amount of information that may be considered improper for certain users, such as minors. For this reason, some access-control and blocking solutions attempt to restrict and filter access to network resources, such as webpages, by classifying or categorizing the types of content provided by network resources and then applying various filtering rules based on such classifications.

A typical webpage may be made up of content from many URLs. For example, a base URL (such as http://www.newsservice.com) may contain content from both the base URL and various other URLs (such as http://www.newsads.com) embedded within the http://www.newsservice.com webpage. Unfortunately, the presence of such embedded URLs may create at least three problems for conventional access-control solutions. First, in some conventional access-control solutions, the requester of a webpage must wait while a client-side access-control module makes numerous queries to a server to obtain classification information for the content provided by both the base URL and each URL embedded within the base URL to ensure that the requester is authorized to view such content. Such queries may add substantial overhead to both the client and the server, potentially delaying rendering of the complete webpage.

Second, if the access-control module decides to block content from a URL embedded within a base URL, this may result in an aesthetically unappealing and confusing blank spot in the rendered webpage. Finally, a base URL may contain embedded URLs that provide content that is difficult to classify or categorize. For example, a base URL may load a stylesheet from an unknown URL, load data from a caching service, display ads from a vendor that provides explicit ads to some sites but not others, or the like.

The instant disclosure describes a filtering system that recursively classifies URLs and their embedded URLs. Recursively classifying URLs may result in a single classification that identifies content within both the base URL and any URLs embedded within the base URL.

SUMMARY

As will be described in greater detail below, the instant disclosure generally relates to systems and methods for restricting access to network resources through recursive URL classification.

In one example, a server-based system may provide a recursive classification of the contents of a URL by: 1) receiving a request for a URL-classification list associated with a base URL, 2) constructing the URL-classification list, and 3) providing, in response to the request, the URL-classification list. The resulting URL-classification list may comprise: 1) content categories occurring in the base URL and 2) content categories occurring in any URLs embedded in the base URL.

In another example, a client-based system may restrict access to network resources, based on the contents of a base URL, by: 1) identifying a request from a user to access a base URL, 2) requesting a URL-classification list associated with the base URL, 3) receiving the URL-classification list, and 4) determining, based on the URL-classification list, that access to the base URL is authorized. As detailed above, this URL-classification list may comprise: 1) content categories occurring in the base URL and 2) content categories occurring in any URLs embedded in the base URL.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for restricting access to network resources, such as webpages, through recursive URL classification. As used herein, "recursive URL classification" may refer to the classification of base URLs and any URLs embedded in such base URLs. An embedded URL may be a URL (such as http://www.newsads.com) that occurs in a base URL (such as http://www.newsservice.com). As will be described in greater detail below, an embedded URL may be several levels removed from a base URL. For example, a second embedded URL may occur in a first embedded URL, which may in turn occur in a base URL. A base URL may represent any URL that a user originally requests through a browser program, such as MICROSOFT INTERNET EXPLORER or FIREFOX.

The phrase "network resource," as used herein, may refer to any file or data, such as a webpage, that a client may request from a server. As will be explained below, a "classification list" may refer to a list of content categories that occur in a URL. A content category may refer to a genre of content that occurs in a network resource. "News," "sports," or "child games" exemplify possible content categories. As used herein, the phrases "occur in the contents of a URL," "in the contents of a URL," and "occur in a URL" are interchangeable.

Figure 1:
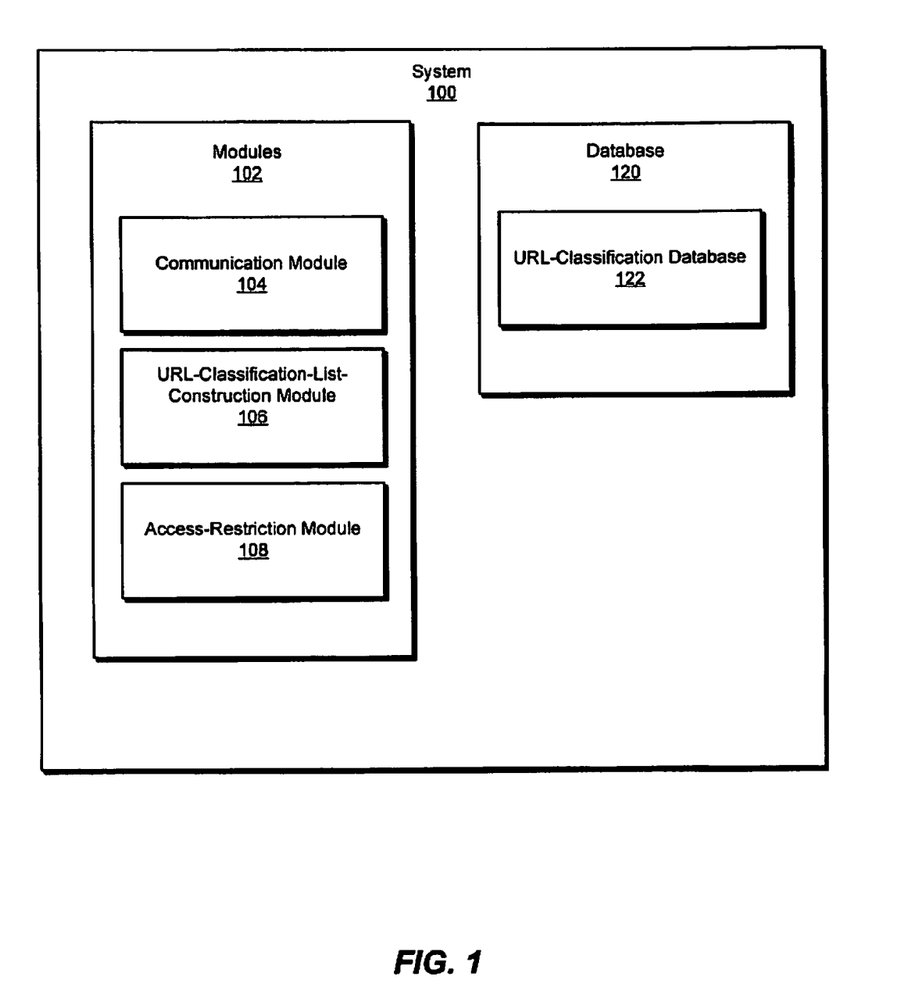
FIG. 1 is a block diagram of an exemplary system for restricting access to network resources through recursive URL classification according to at least one embodiment.
Figure 2:
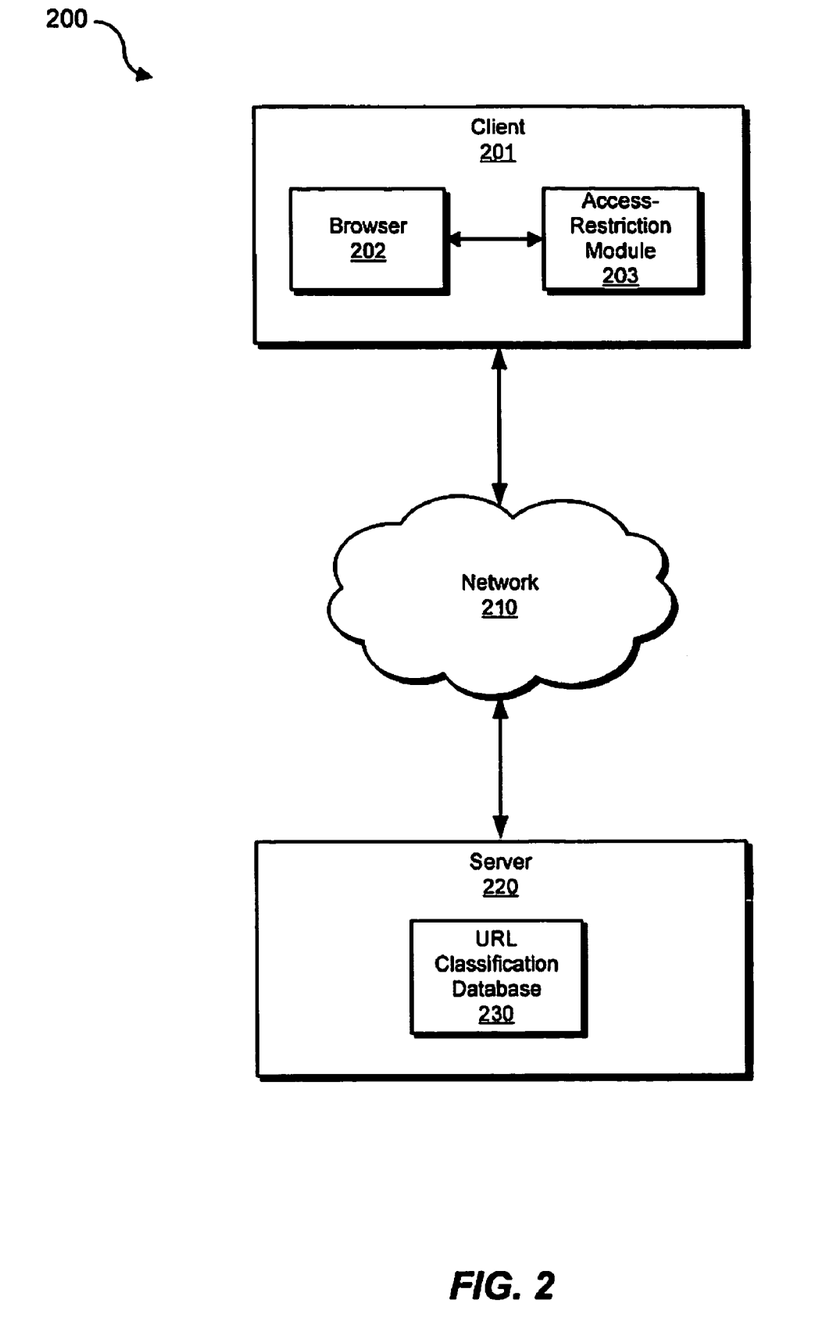
FIG. 2 is a block diagram of an exemplary system for restricting access to network resources through recursive URL classification according to an additional embodiment.

The following will provide, with reference to FIGS. 1 and 2, detailed descriptions of exemplary systems for restricting access to network resources through recursive URL classification. A detailed description of an exemplary computer-implemented method for providing a recursive classification of a URL will be provided in connection with FIG. 3. In addition, a detailed description of an exemplary computer-implemented method for restricting access to network resources based on the contents of a URL will be provided in connection with FIG. 6.

FIG. 1 is a block diagram of an exemplary system 100 for restricting access to network resources through recursive URL classification. As illustrated in this figure, exemplary system 100 may comprise one or more modules 102 for performing one or more tasks. For example, exemplary system 100 may comprise a communication module 104 for facilitating communication between users, network resources, and an access-restriction system. Exemplary system 100 may also comprise a URL-classification-list-construction module 106 for preparing and providing recursive URL classification lists.

Exemplary system 100 may further comprise an access-restriction module 108 for requesting a recursive URL classification list and determining, based on the recursive URL classification list, whether access to a network resource is authorized for a user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks required to restrict access to network resources through recursive URL classification. For example, as will be described in greater detail below, one or more of modules 102 may represent software modules configured to run on one or more computing devices, such as the devices illustrated in FIG. 2 (e.g., client 201 and/or server 220), computing system 810 in FIG. 8, and/or portions of exemplary network architecture 900 in FIG. 9. One or more modules 102 in FIG. 1 may also represent all or portions of one or more special-purpose computers configured to perform one or more tasks required to restrict access to network resources through recursive URL classification.

As illustrated in FIG. 1, exemplary system 100 may also comprise one or more databases 120. For example, exemplary system 100 may comprise a URL-classification database 122 for storing data to facilitate construction of recursive URL classifications. Databases 120 may represent portions of a single database or computing device or a plurality of databases or computing devices.

In addition, one or more of databases 120 in FIG. 1 may represent a portion of one or more computing devices. For example, one or more of databases 120 may represent a portion of one or more of the devices in FIG. 2, computing system 810 in FIG. 8, and/or portions of exemplary network architecture 900 in FIG. 9. Alternatively, one or more of databases 120 in FIG. 1 may represent one or more physically separate devices capable of being accessed by a computing device, such as the devices in FIG. 2, computing system 810 in FIG. 8, and/or portions of exemplary network architecture 900 in FIG. 9.

Exemplary system 100 in FIG. 1 may be deployed in a variety of ways. In one example, system 100 may be deployed within a networked system. FIG. 2 is a block diagram of an exemplary networked system 200 in which system 100 in FIG. 1 may be deployed. As illustrated in this figure, exemplary system 200 may comprise a client 201 in communication with a server 220 via a network 210. As will be described below in connection with FIG. 3, client 201 in FIG. 2 may transmit a request for a URL-classification list for a base URL to server 220 via network 210.

Client 201 in FIG. 2 generally represents any type or form of client-side computing device capable of executing computer-readable instructions. In certain embodiments, client 201 may comprise one or more portions of exemplary system 100 in FIG. 1. For example, one or more of modules 102 from FIG. 1 may be stored or configured to run on client 201 in FIG. 2. Similarly, client 201 may comprise one or more of databases 120 in FIG. 1.

Network 210 generally represents any type or form of communication or computing network; including, for example, an intranet, a wide area network (WAN), a local area network (LAN), a personal area network (PAN), or the Internet.

As illustrated in FIG. 2, exemplary system 200 may also comprise a server 220. Server 220 generally represents any type or form of server-side computing device. In certain embodiments, server 220 may comprise one or more portions of exemplary system 100 in FIG. 1. For example, one or more of modules 102 from FIG. 1 may be stored or configured to run on server 220 in FIG. 2. Similarly, server 220 may comprise one or more of databases 120 in FIG. 1.

Figure 3:
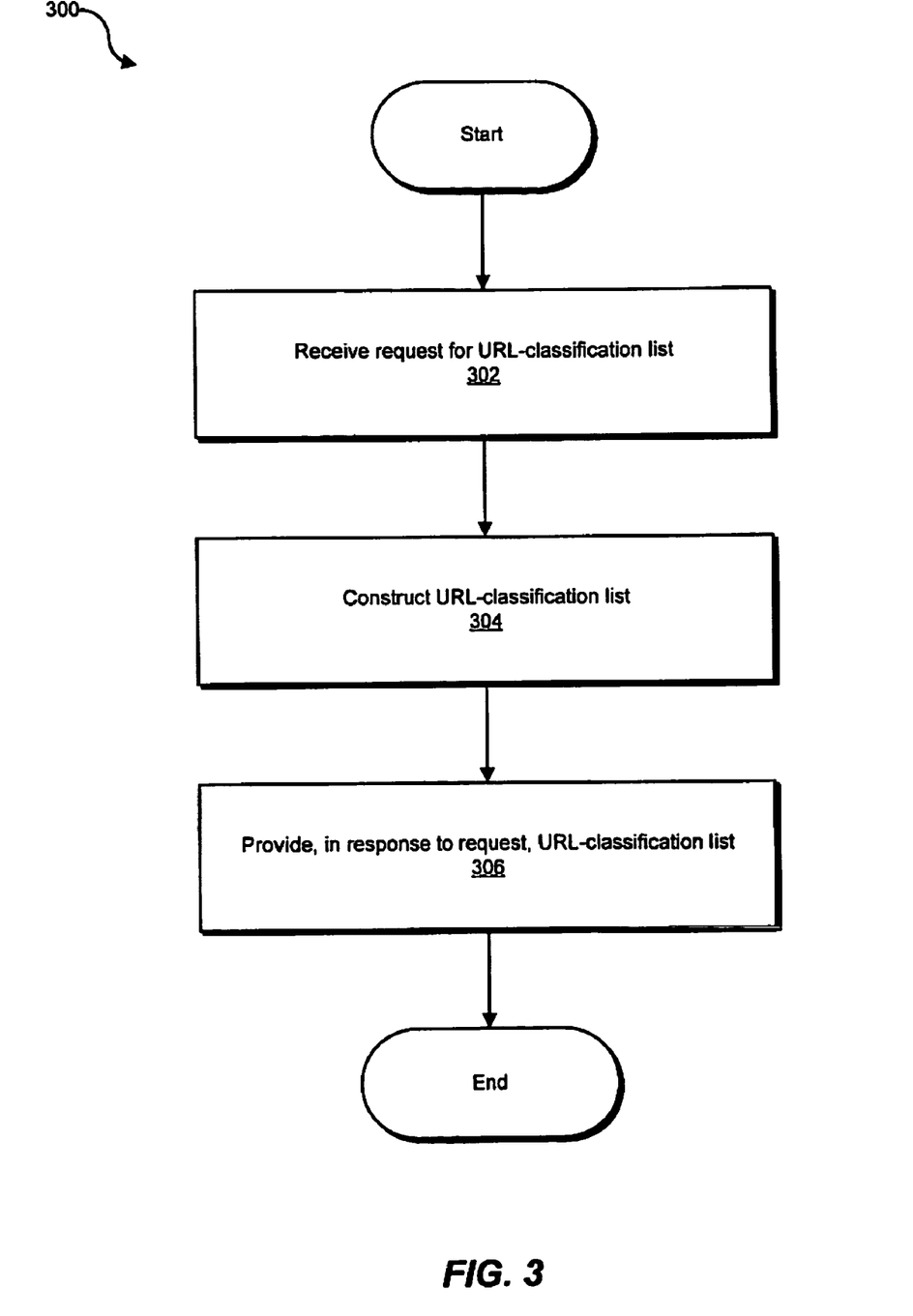
FIG. 3 is a flow diagram of an exemplary computer-implemented method for providing a recursive classification of the contents of a URL.

FIG. 3 is a flow diagram of an exemplary computer-implemented method 300 for providing a recursive classification of a URL. As illustrated in this figure, at step 302 the system may receive a request for a URL-classification list for a base URL. For example, as illustrated in FIG. 2, server 220 may receive a request from client 201 for a recursive classification for a base URL requested by a user using browser 202.

The request may comprise at least the base URL for which a URL-classification list is requested. As described herein, a base URL (such as http://www.newsservice.com) may be distinguished from an "embedded URL" (such as http://www.newsads.com), which may represent a URL that occurs in a base URL or another embedded URL.

Figure 4:
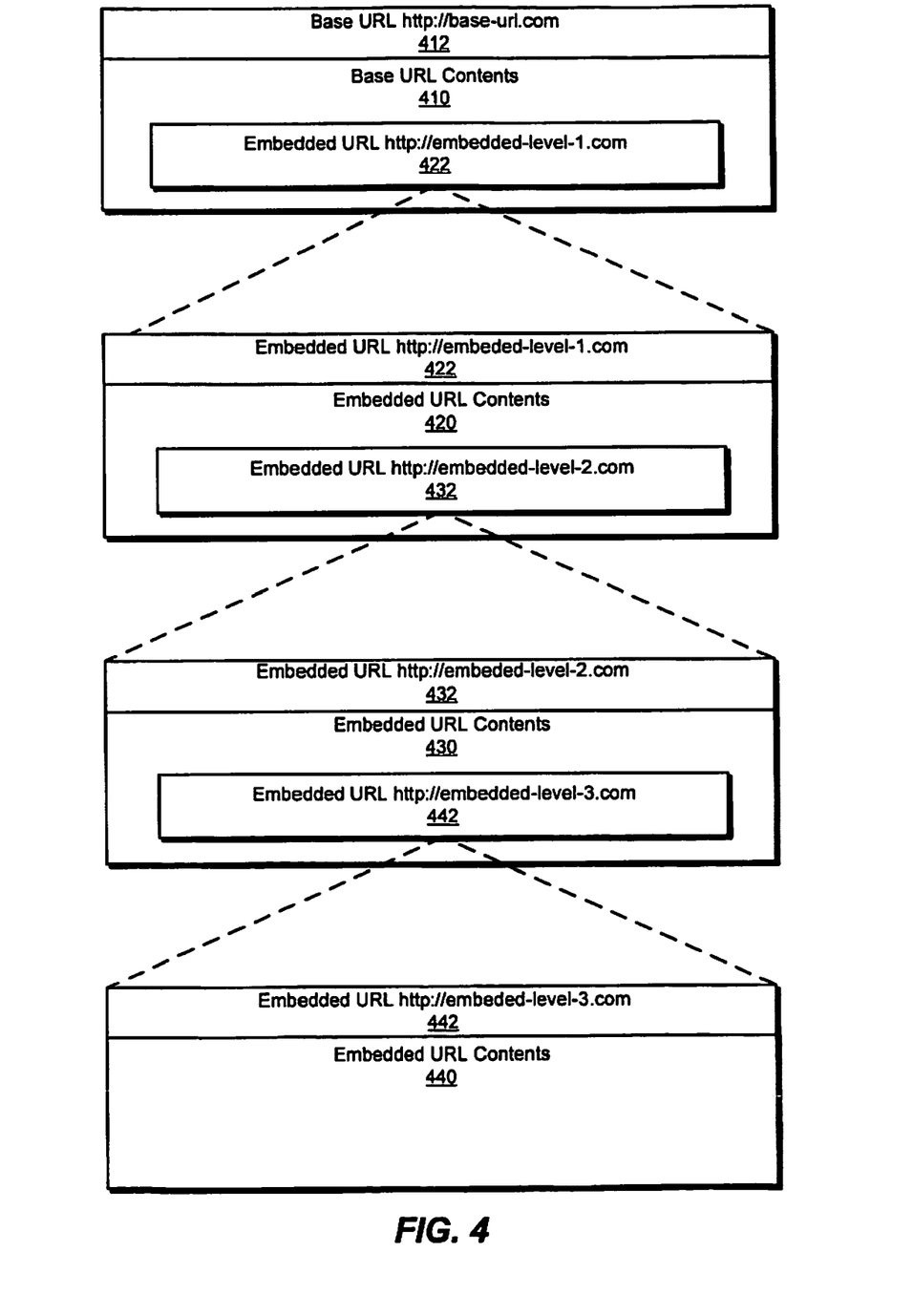
FIG. 4 illustrates an exemplary base URL and associated embedded URLs.

FIG. 4 illustrates the concept of a base URL and embedded URLs. As illustrated in this figure, the contents 410 of a base URL 412 ("http://base-url.com") may contain a first embedded URL 422 ("http://embedded-level-1.com"). In this example, first embedded URL 422 may be said to be embedded at a depth or level of 1 with respect to base URL 412; i.e., first embedded URL 422 is one level removed from base URL 412.

A URL may be recursively embedded, i.e., embedded at a depth greater than 1. For example, a second embedded URL 432 ("http://embedded-level-2.com") may be embedded within the contents 420 of first embedded URL 422. In this example, second embedded URL 432 is embedded at depth 2 relative to base URL 412; i.e., second embedded URL 432 is two levels removed from base URL 412. Similarly, a third embedded URL 442 ("http://embedded-level-3.com") may be embedded within the contents 430 of second embedded URL 432. In this example, third embedded URL 442 is embedded at depth 3 relative to base URL 412; i.e., third embedded URL 442 is three levels removed from base URL 412. FIG. 4 provides only one example of a webpage with embedded URLs. URLs may be embedded in various ways and at various depths.

Returning to FIG. 3, at step 304 in FIG. 3 the system may construct a URL-classification list associated with the base URL identified in the request received in step 302. The system may perform step 304 in a variety of ways. In one embodiment, the system may construct a URL-classification list containing content categories that occur in both the base URL and in any URLs embedded within the base URL up to a certain depth, such as depth 1. For example, URL-classification-list-construction module 106 may, in response to the request received in step 302, create a URL-classification list for base URL 412 that identifies: 1) content categories for base URL 412 and 2) content categories for first embedded URL 422 embedded in base URL 412 at depth 1 relative to base URL 412.

Figure 5:
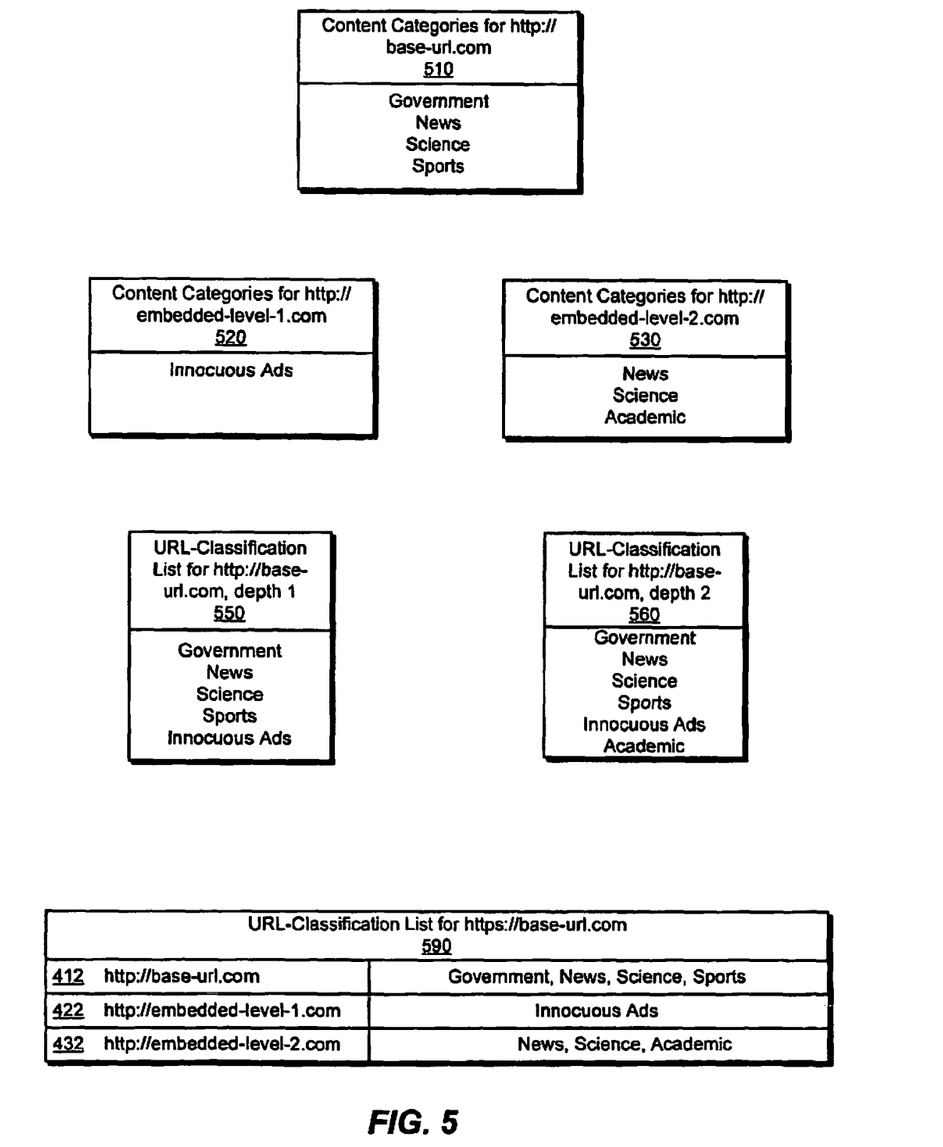
FIG. 5 illustrates exemplary URL-classification lists associated with an exemplary base URL and any URLs embedded in the base URL.

FIG. 5 is an illustration of exemplary content categories that may occur in base URL 412 and first embedded URL 422 (which is embedded at depth 1 relative to base URL 412). As illustrated in FIG. 5, four categories of content ("content categories 510") may appear in base URL 412: Government, News, Science, and Sports. Similarly, a single content category 520, Innocuous Ads, may occur in first embedded URL 422. In this example, URL-classification-list-construction module 106 may construct a URL-classification list 550 for base URL 412 and first embedded URL 422 (which is embedded at depth 1 relative to base URL 412) by combining the content categories 510 for base URL 412 with the content categories 520 for first embedded URL 422.

In another embodiment of step 304, the system may construct a URL-classification list that may contain content categories that occur in both the base URL and in URLs embedded in the base URL up to a maximum-embedding depth. As used herein, the phrase "maximum-embedding depth" may refer to a maximum depth relative to a base URL (that is, a maximum number of levels removed from a base URL) for which the system may identify content categories. For example, the request received in step 302 may specify a maximum-embedding depth of 2 for base URL 412. Alternatively, URL-classification-list-construction module 106 in FIG. 1 may retrieve a maximum-embedding depth of 2 for base URL 412 from URL classification database 230 in FIG. 2. In either example, URL-classification-list-construction module 106 may then create a URL-classification list 560 in FIG. 5 comprising: 1) content categories that occur in base URL 412 and 2) content categories that occur in embedded URLs 422 and 432, which are embedded at depths 1 and 2, respectively, relative to base URL 412.

For example, URL-classification-list-construction module 106 may construct URL-classification list 560 for base URL 412 and embedded URLs 422 and 432 (which are embedded at depths 1 and 2, respectively, relative to base URL 412) by combining the content categories 510 for base URL 412 with the content categories 520 and 530 for first embedded URL 422 and second embedded URL 432.

In another embodiment of step 304, the system may construct a URL-classification list using information retrieved from a URL-classification database, such as URL-classification database 230 in FIG. 2. For example, server 220, upon receiving a request for a URL-classification list in step 302, may request data for construction of the URL-classification list from URL-classification database 230. URL-classification database 230 may be located in various places. For example, URL-classification database 230 may be located partially or in whole on server 220. In additional embodiments, URL-classification database 230 may be located partially or in whole on other servers with which server 220 communicates via network 210.

URL-classification database 230 may store, for example, URLs, content categories occurring in specific URLs, URLs embedded in specific URLs, embedding depths for embedded URLs, and various other data. As used herein, "embedding depth" may refer to the depth at which a URL is embedded relative to a base URL. In one embodiment, URL-classification database 230 may store an identification of unstable URLs, i.e., URLs that contain unstable content. The term "unstable content" may refer to content in a URL that fluctuates frequently. URL-classification database 230 may store data associated with unstable URLs differently than data associated with stable URLs. For example, URL-classification database 230 may not store content categories associated with an unstable URL.

In another embodiment of step 304, a URL-classification list may identify content categories per URL. In this example, the URL-classification list may identify a base URL, any URLs embedded in the base URL, and a list (for each of the base and embedded URLs) of the content categories that occur in each URL. For example, at step 302 server 220 may receive a request for a URL-classification list associated with base URL 412 and any URLs embedded within base URL 412. In this example, and as illustrated in FIG. 5, URL-classification-list-construction module 106 may construct a URL-classification list 590 that identifies the content categories that occur in base URL 412, the content categories that occur in first embedded URL 422, and the content categories that occur in second embedded URL 432.

In another possible instance of step 304, the system may construct a URL-classification list that additionally identifies a maximum-embedding depth or unstable URLs.

Returning to FIG. 3, at step 306 the system may provide, in response to the request, the URL-classification list. For example, server 220 may, in response to the request from client 201 in step 302, transmit a URL-classification list to client 201 via network 210. As detailed above, this URL-classification list may identify: 1) content categories that occur in the base URL and 2) content categories that occur in any URLs embedded in the base URL. Upon completion of step 306, exemplary method 300 in FIG. 3 may terminate.

Figure 6:
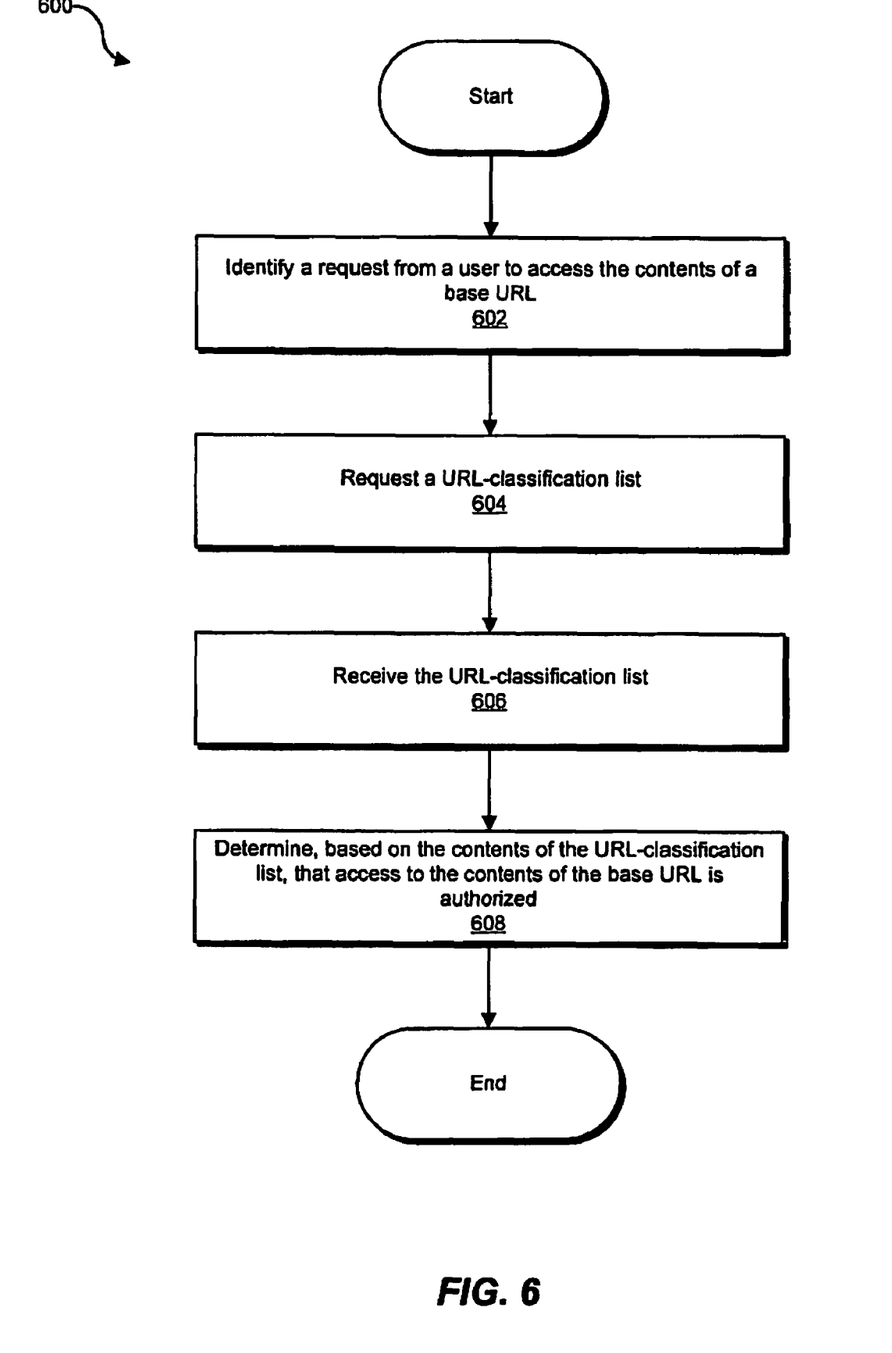
FIG. 6 is a flow diagram of an exemplary computer-implemented method for restricting access to network resources based on the contents of a URL.

FIG. 6 is a flow diagram of an exemplary computer-implemented method 600 for restricting access to network resources based on the contents of a URL. As illustrated in this figure, at step 602 the system may identify a request from a user to access a base URL. For example, access-restriction module 203 may identify a request from a user-operated browser 202 to access a base URL (such as http://www.newsservice.com).

Step 602 in FIG. 6 may be performed in a variety of ways. In one exemplary embodiment, access-restriction module 203 may be installed as a part of browser 202. Alternatively, access-restriction module 203 may be situated independently from browser 202, but nonetheless on the same client 201. In such a configuration, requests from browser 202 may pass through access-restriction module 203. In another alternative, access-restriction module 203 may be situated on a network proxy or gateway that is distinct from client 201. In such an arrangement, all requests for contents of a base URL may pass through the network proxy or gateway, where access-restriction module 203 may identify requests. For example, a user may type a base URL into the address line of browser 202. Browser 202 may request the base URL via the network proxy or gateway, where access-control module 203 may identify the request.

At step 604 in FIG. 6, the system may request a URL-classification list for a base URL. For example, access-restriction module 203 on client 201 may request, via network 210, a URL-classification list for base URL 412 from server 220.

Step 604 may be performed in a variety of ways. In one embodiment, the request may identify a maximum-embedding depth. The maximum-embedding depth may indicate the maximum depth, from the base URL, at which embedded URLs are to be considered in constructing the URL-classification list. For example, access-restriction module 203 may request from server 220 a URL-classification list for base URL 412. Access-restriction module 203 may indicate, in the request, a maximum-embedding depth of 2. In this example, URL-classification-list-construction module 106 may create a URL-classification list that identifies the content categories that occur only in contents 410 of base URL 412, contents 420 of first embedded URL 422, and contents 430 of embedded URL 432. However, URL-classification-list-construction module 106 will refrain from including the content categories occurring in contents 440 of third embedded URL 442 since third embedded URL 442 is embedded at a depth of 3 relative to base URL 412, which is greater than the maximum-embedding depth of 2.

At step 606 in FIG. 6, the system may receive a URL-classification list in response to the request in step 604. For example, access-restriction module 203 may receive a URL-classification list for base URL 412, via network 210, from server 220.

The system may perform step 606 in a variety of ways. In one embodiment, access-restriction module 203 may receive a URL-classification list containing content categories that occur in both the base URL and in any URLs embedded within the base URL up to a certain depth, such as depth 1 relative to the base URL. For example, access-restriction module 203 may, in response to the request transmitted in step 604, receive a URL-classification list for base URL 412 that identifies: 1) content categories for base URL 412 and 2) content categories for first embedded URL 422 embedded in base URL 412 at depth 1 relative to base URL 412.

In another embodiment of step 606, access-restriction module 203 may receive a URL-classification list that may contain content categories that occur in both the base URL and in URLs embedded in the base URL up to a maximum-embedding depth. For example, the request in step 604 may specify a maximum-embedding depth of 2 for base URL 412. Alternatively, URL-classification-list-construction module 106 in FIG. 1 may retrieve a maximum-embedding depth of 2 for base URL 412 from URL classification database 230 in FIG. 2. In either example, access-restriction module 203 may receive URL-classification list 560 in FIG. 5 comprising: 1) content categories that occur in base URL 412 and 2) content categories that occur in embedded URLs 422 and 432, which are embedded at depths 1 and 2, respectively, relative to base URL 412.

In another embodiment of step 606, the URL-classification list may comprise content categories per URL. The URL-classification list may specify the base URL, any URLs embedded in the base URL, and a list (for each of the base and embedded URLs) of the content categories that occur in each URL. For example, at step 602 access-restriction module 203 may transmit a request for a URL-classification list associated with base URL 412 and any URLs embedded within base URL 412. In this example, and as illustrated in FIG. 5, access-restriction module 203 may receive a URL-classification list 590 that identifies the content categories that occur in base URL 412, the content categories that occur in first embedded URL 422, and the content categories that occur in second embedded URL 432.

At step 608 in FIG. 6, the system may determine, based on the contents of the URL-classification list, that access to the base URL is authorized. For example, access-restriction module 203 may identify, at step 602, a request from User 1 in FIG. 7 to access base URL 412. Access-restriction module 203 may then request (at step 604) and receive (at step 606) a URL-classification list 550 in FIG. 5 for base-URL 412. Access-restriction module 203 may then retrieve a list 204(A) of authorized content categories for User 1. Based on a comparison of the authorized categories for User 1 and the content categories for base URL 412 in URL-classification list 550, access-restriction module 203 may determine that User 1 is not authorized to access base URL 412 because User 1 is authorized to access only Juvenile Games and Innocuous Ads, but not Government, News, Science, or Sports content.

The system may perform step 608 in a variety of ways. In one embodiment, access-restriction module 203 may determine that access to the base URL is authorized by: 1) retrieving a user-categories list associated with the user and 2) determining that the user-categories list comprises at least all of the content categories in the URL-classification list.

Figure 7:
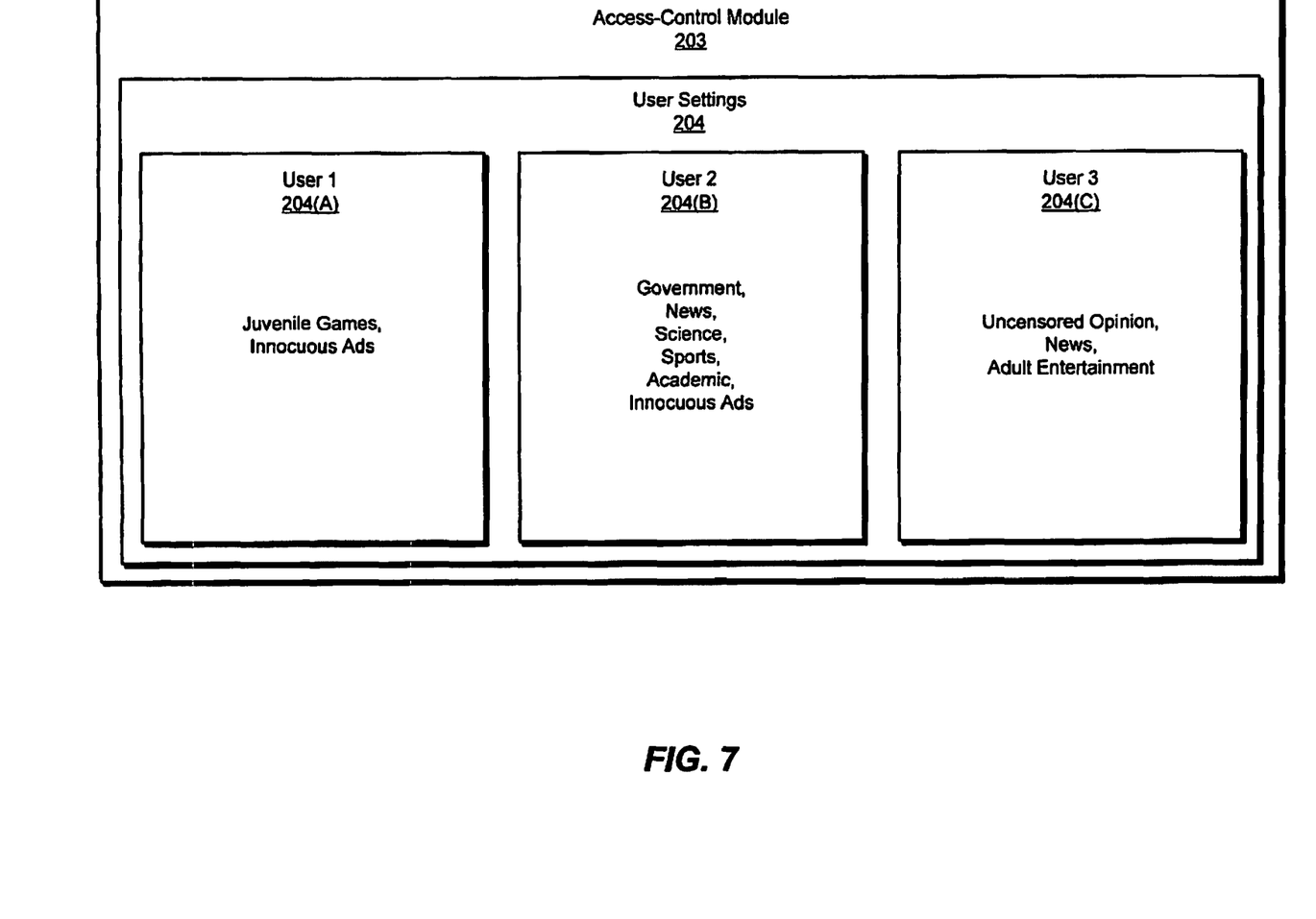
FIG. 7 illustrates exemplary user-category lists.

A user-categories list associated with a user may identify the content categories that the user is authorized to access. FIG. 7 illustrates three exemplary user-categories lists 204(A), 204(B), 204(C) for Users 1, 2, and 3, respectively. As an example, User 1 may direct browser 202 to request base URL 412. Access-restriction module 203, having identified the request in step 602, may request a URL-classification list associated with base URL 412. Access-restriction module 203 may subsequently receive URL-classification list 550 associated with base URL 412. Access-restriction module 203 may then retrieve user-categories list 204(A), which may identify the content categories that User 1 is authorized to access.

Access-restriction module 203 may then compare the content categories in URL-classification list 550 with the content categories in user-category list 204(A). Because user-category list 204(A) does not contain at least all categories in URL-classification list 550, access-restriction module 203 may determine that User 1 is not authorized to access base URL 412. However, if User 2 from FIG. 7 makes the same request to access base URL 412, then access-control module 203 may determine that access to base URL 412 is authorized because user-categories list 204(B) for User 2 contains at least all of the categories in URL-classification list 550 for base URL 412.

In an alternative embodiment of step 608, access-restriction module 203 may determine that access to the base URL is authorized by: 1) retrieving a user-categories list associated with the user, 2) determining that the user-categories list comprises at least all of the content categories that occur in the base URL, 3) permitting access to the base URL, 4) identifying any URLs embedded in the base URL, and then 5) permitting access to each embedded URL for which the user-categories list comprises at least all of the content categories that occur in the embedded URL.

For example, User 2 may direct browser 202 to request base URL 412 from server 220. Access-restriction module 203, having identified the request in step 602, may request a URL-classification list for base URL 412 in step 604. Access-restriction module 203 may then receive URL-classification list 590 associated with base URL 412 in step 606. Access-restriction module 203 may then retrieve user-categories list 204(B), which identifies the content categories that User 2 is authorized to access.

Access-restriction module 203 may then compare the content categories 591 that occur in base URL 412 with the content categories in user-category list 204(B). Because user-category list 204(B) contains at least all categories in content categories 591, access-restriction module 203 may determine that access to base URL 412 is authorized. Access-control module 203 may next identify the embedded URLs 422 and 432 in URL-classification list 590. As seen in FIG. 5, URL-classification list 590 identifies the content categories 592 and 593 that occur in embedded URLs 422 and 432, respectively.

Access-control module 203 may then compare the content categories for each embedded URL with user-category list 204(B). Because user-category list 204(B) contains at least all of the categories in content categories 592, access-restriction module 203 may determine that User 2 is authorized to access first embedded URL 422.

However, because user-category list 204(B) does not contain at least all of the categories in content categories 593, access-control module 203 may determine that User-B is not permitted to access embedded URL 432. As such, access-control module 203 may permit browser 202 to render base URL 412 and first embedded URL 422, but prevent browser 202 from rendering second embedded URL 432. In some embodiments, access-control module 203 may instruct browser 202 to display a blank space or a non-authorization notification where second embedded URL 432 would have appeared. Upon completion of step 608 in FIG. 6, exemplary method 600 may terminate.

The systems and methods disclosed herein may be implemented in a variety of ways and provide a number of advantages over the prior art. For example, recursive classification of URLs may minimize rendering delays for webpages because the system may make only one query to the server for a URL-classification list, instead of transmitting separate requests for each URL embedded in a webpage. Recursively classifying URLs also allows a system to avoid blank spots on rendered webpages that occur when the system determines that a base URL is authorized but an embedded URL is not authorized. By recursively classifying a URL, the system may determine that the base URL itself is not authorized if any embedded URLs are not authorized.

Figure 8:
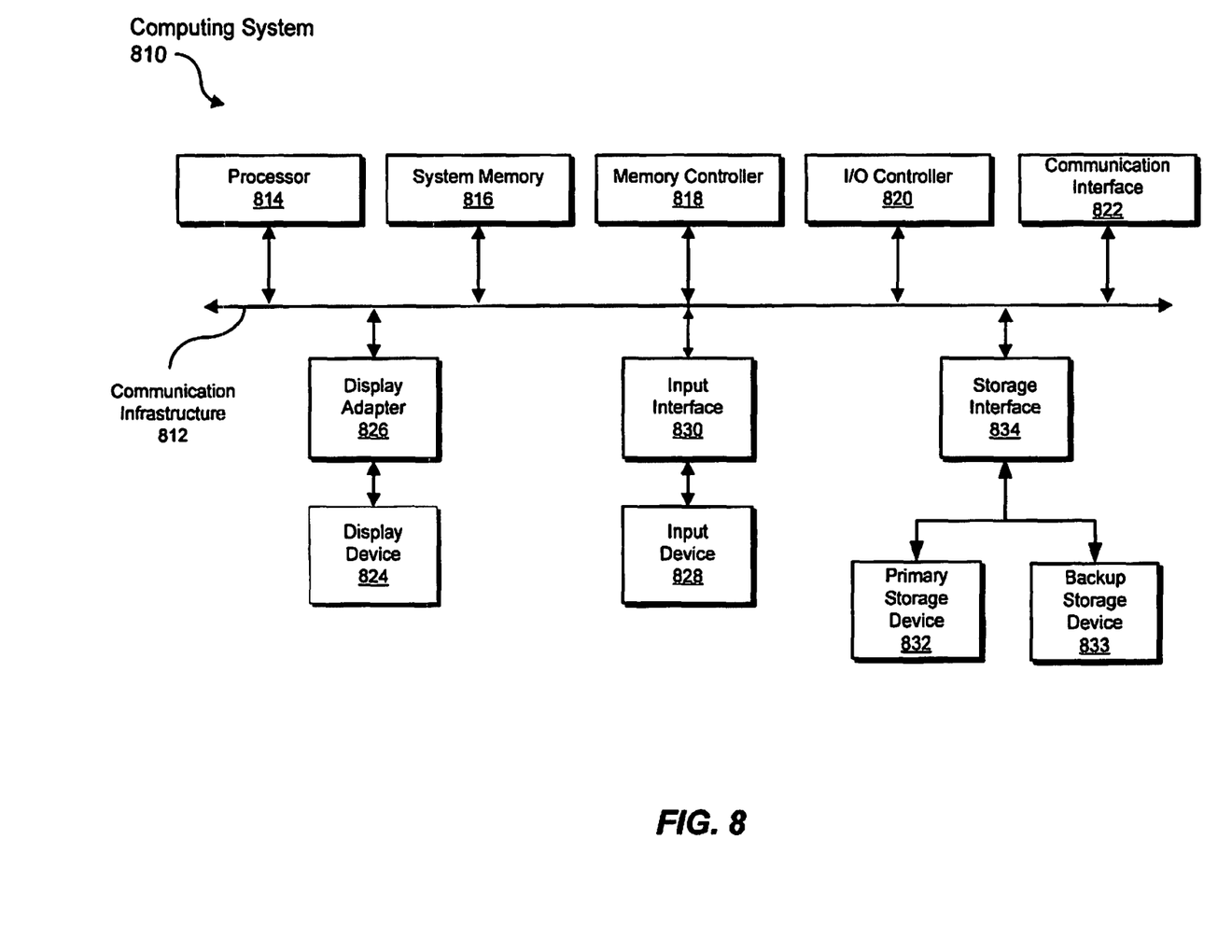
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may comprise at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the receiving, constructing, providing, retrieving, identifying, requesting, determining, and permitting steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may comprise both a volatile memory unit (such as, for example, system memory 816) and a non-volatile storage device (such as, for example, primary storage device 832, as described in detail below).

In certain embodiments, exemplary computing system 810 may also comprise one or more components or elements in addition to processor 814 and system memory 816. For example, as illustrated in FIG. 8, computing system 810 may comprise a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller may perform and/or be a means for performing, either alone or in combination with other elements, one or more of the steps or features described and/or illustrated herein, such as receiving, constructing, providing, retrieving, identifying, requesting, determining, and/or permitting.

I/O controller 820 generally represents any type or form of module capable of coordinating and/or controlling the input and output functions of a computing device. For example, in certain embodiments I/O controller may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the receiving, constructing, providing, retrieving, identifying, requesting, determining, and permitting steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network comprising additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 894 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the receiving, constructing, providing, retrieving, identifying, requesting, determining, and permitting steps disclosed herein. Communication interface 822 may also be used to perform and/or be a means for performing other steps and features set forth in the instant disclosure.

As illustrated in FIG. 8, computing system 810 may also comprise at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also comprise at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the receiving, constructing, providing, retrieving, identifying, requesting, determining, and permitting steps disclosed herein. Input device 828 may also be used to perform and/or be a means for performing other steps and features set forth in the instant disclosure.

As illustrated in FIG. 8, exemplary computing system 810 may also comprise a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also comprise other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, the exemplary file systems disclosed herein may be stored on primary storage device 832, while the exemplary file-system backups disclosed herein may be stored on backup storage device 833. Storage devices 832 and 833 may also be used, for example, to perform and/or be a means for performing, either alone or in combination with other elements, one or more of the receiving, constructing, providing, retrieving, identifying, requesting, determining, and permitting steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
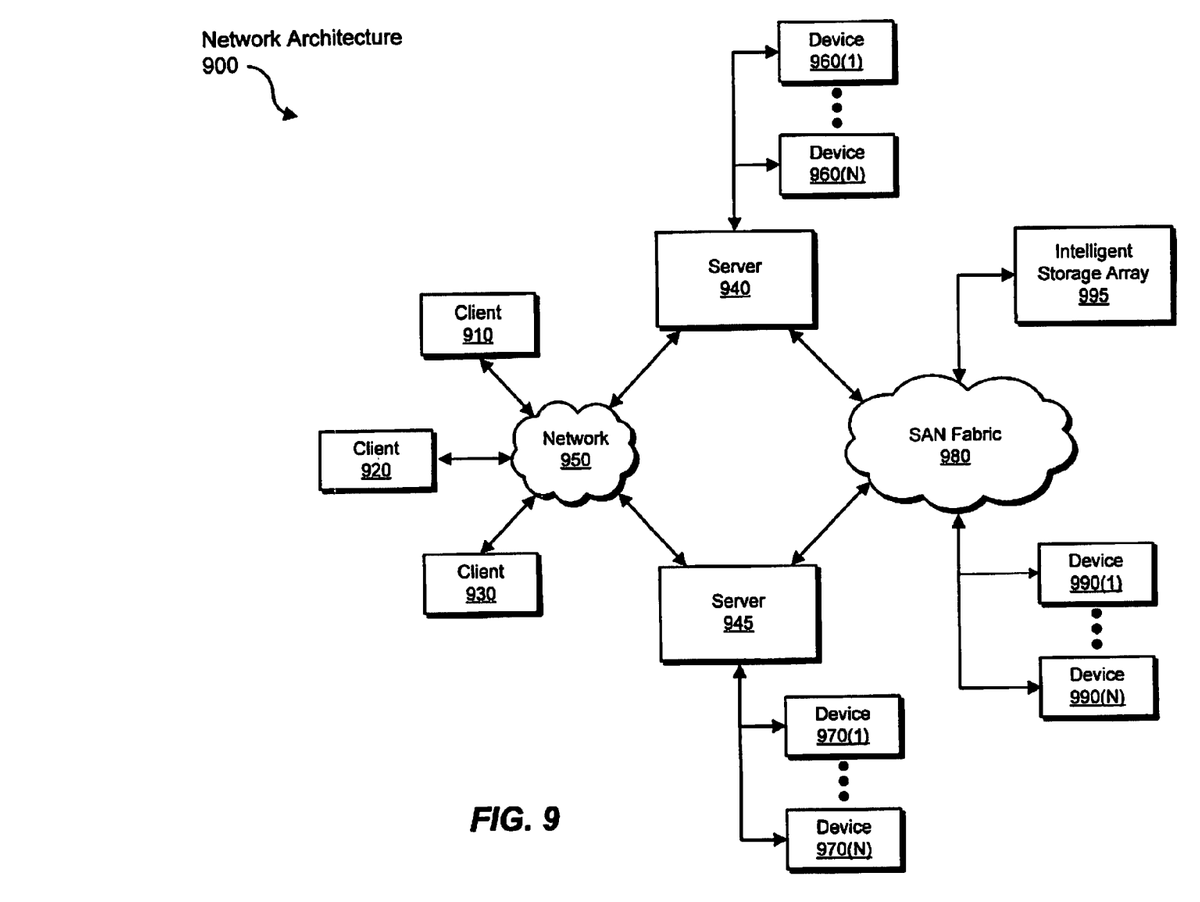
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or to run certain software applications. Network 950 generally represents any telecommunication or computer network; including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the receiving, constructing, providing, retrieving, identifying, requesting, determining, and permitting steps disclosed herein. Network architecture 900 may also be used to perform and/or be a means for performing other steps and features set forth in the instant disclosure.

As detailed above, computing system 810 and/or one or more of the components of network architecture 900 may perform and/or be a means for performing, either alone or in combination with other elements, one or more steps of an exemplary method for providing a recursive classification of a URL. In this example, the method may comprise: 1) receiving a request for a URL-classification list associated with a base URL, 2) constructing the URL-classification list, and 3) providing, in response to the request, the URL-classification list.

The URL-classification list may comprise: 1) content categories that occur in the base URL and 2) content categories that occur in any URL embedded in the base URL. The URL-classification list may further comprise content categories that occur in any URL embedded multiple levels from the base URL, where the number of levels is limited by a maximum-embedding depth.

Constructing the URL-classification list may further comprise retrieving information to construct the URL-classification list from a URL-classification database. The URL-classification database may identify URLs with unstable content. The URL-classification list may additionally identify URLs with unstable content that are embedded in the base URL.

The URL-classification list may additionally comprise 1) a URL list comprising the base URL and URLs embedded in the base URL and 2) content categories that occur in each URL in the URL list. The URL list may further identify any URL embedded multiple levels from the base URL, with the number of levels being limited by a maximum-embedding depth. The URL-classification list may also further identify the maximum-embedding depth.

Computing system 810 and/or one or more of the components of network architecture 900 may also perform and/or be a means for performing, either alone or in combination with other elements, one or more steps of an exemplary method for restricting access to network resources based on the contents of a URL. In this example, the method may comprise: 1) identifying a request from a user to access a base URL, 2) requesting a URL-classification list associated with the base URL, 3) receiving the URL-classification list, and 4) determining, based on the URL-classification list, whether access to the base URL is authorized.

The URL-classification list may comprise: 1) content categories that occur in the base URL and 2) content categories that occur in any URL embedded in the base URL. The URL-classification list may further comprise content categories that occur in any URL embedded multiple levels from the base URL, with the number of levels being limited by a maximum-embedding depth.

In another example, the URL-classification list may comprise: 1) a URL list that identifies the base URL and any URLs embedded in the base URL and 2) content categories that occur in each URL in the URL list. In one embodiment, requesting a URL-classification list may comprise indicating a maximum-embedding depth.

According to one embodiment, determining whether access to the URL is authorized may comprise: 1) retrieving a user-categories list associated with the user and 2) determining whether the user-categories list comprises at least all of the content categories in the URL-classification list. The user-categories list may comprise content categories that the user is authorized to access.

According to an alternative embodiment, determining whether access to the URL is authorized may comprise: 1) retrieving a user-categories list associated with the user, with the user-categories list identifying content categories that the user is authorized to access, 2) determining that the user-categories list comprises at least all of the content categories that occur in the base URL, 3) permitting access to the base URL, 4) identifying each URL embedded in the base URL, 5) determining that the user-categories list comprises at least all of the content categories that occur in at least one embedded URL, and then 6) permitting access to at least one embedded URL.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing a recursive classification of the contents of a URL, at least a portion of the method being performed by a server-side computing device comprising at least one processor, the method comprising:

receiving, from an access-restriction module installed on an additional computing device, a request for a URL-classification list for a base URL;
constructing the URL-classification list for the base URL, the URL-classification list comprising:
   content categories that identify genres of content that occur in the base URL;
   content categories that identify genres of content that occur in any URL embedded in the base URL;
providing, in response to the request, the URL-classification list for the base URL to the access-restriction module installed on the additional computing device to enable the access-restriction module to determine whether to permit a user to access the base URL by:
   retrieving a user-categories list for the user that specifies content categories that the user is authorized to access;
   determining, by comparing the content categories contained within the URL-classification list with the content categories specified in the user-categories list, that the URL-classification list does not contain any content categories that the user is not authorized to access;
   upon determining that the URL-classification list does not contain any content categories that the user is not authorized to access, permitting the user to access the base URL.

2. The method of claim 1, wherein the URL-classification list further comprises content categories that occur in any URL embedded multiple levels from the base URL, the number of levels being limited by a maximum-embedding depth.

3. The method of claim 1, wherein constructing the URL-classification list comprises retrieving information to construct the URL-classification list from a URL-classification database.

4. The method of claim 3, wherein retrieving the information to construct the URL-classification list comprises identifying URLs with unstable content.

5. The method of claim 1, wherein the URL-classification list further comprises:
   a URL list that identifies the base URL and any URLs embedded in the base URL;
   content categories that occur in each URL in the URL list.

6. The method of claim 5, wherein the URL list further identifies any URL embedded multiple levels from the base URL, the number of levels being limited by a maximum-embedding depth.

7. The method of claim 6, wherein the URL-classification list further identifies the maximum-embedding depth.

8. The method of claim 4, wherein the URL-classification list further identifies URLs with unstable content that are embedded in the base URL.

9. A computer-implemented method for restricting access to network resources based on the contents of a URL, at least a portion of the method being performed by a computing device comprising at least one processor, the method comprising:
   identifying a request from a user to access a base URL;
   requesting a URL-classification list for the base URL;
   receiving the URL-classification list for the base URL, the URL-classification list comprising:
      content categories that identify genres of content that occur in the base URL;
      content categories that identify genres of content that occur in any URL embedded in the base URL;
   determining whether to permit the user to access the base URL by:

retrieving a user-categories list for the user that specifies content categories that the user is authorized to access;

determining, by comparing the content categories contained within the URL-classification list for the base URL with the content categories specified in the user-categories list, that the URL-classification list does not contain any content categories that the user is not authorized to access;

upon determining that the URL-classification list does not contain any content categories that the user is not authorized to access, permitting the user to access the base URL.

10. The method of claim 9, wherein requesting the URL-classification list further comprises indicating a maximum-embedding depth.

11. The method of claim 9, wherein the URL-classification list further comprises content categories that occur in any URL embedded multiple levels from the base URL, the number of levels being limited by a maximum-embedding depth.

12. The method of claim 9, wherein the URL-classification list further comprises:

a URL list that identifies the base URL and any URLs embedded in the base URL;

content categories that occur in each URL in the URL list.

13. The method of claim 9, wherein determining whether to permit the user to access the base URL is further comprises:

identifying at least one URL embedded in the base URL;

determining, by comparing content categories identified by the URL-classification list as occurring within the embedded URL with the content categories specified in the user-categories list, that the embedded URL does not contain any content categories that the user is not authorized to access;

permitting the user to access the embedded URL.

14. A system for restricting access to network resources through recursive URL classification, the system comprising:

an access-control module programmed to:
identify a request from a user to access a base URL;
request a URL-classification list for the base URL;
receive the URL-classification list for the base URL, the URL-classification list comprising:
content categories that identify genres of content that occur in the base URL;
content categories that identify genres of content that occur in any URL embedded in the base URL;

determine whether to permit the user to access the base URL by:
retrieving a user-categories list for the user that specifies content categories that the user is authorized to access;

determining, by comparing the content categories contained within the URL-classification list for the base URL with the content categories specified in the user-categories list, that the URL-classification list does not contain any content categories that the user is not authorized to access;

upon determining that the URL-classification list does not contain any content categories that the user is not authorized to access, permit the user to access the base URL;

at least one processor configured to execute the access-control module.

15. The system of claim 14, wherein the URL-classification list further comprises content categories that occur in any URL embedded multiple levels from the base URL, the number of levels being limited by a maximum-embedding depth.

16. The system of claim 14, wherein the URL-classification list further identifies URLs with unstable content.

17. The system of claim 14, wherein the URL-classification list further comprises:

a URL list that identifies the base URL and any URLs embedded in the base URL;

content categories that identify content that occurs in each URL in the URL list.

18. The system of claim 17, wherein the URL list further identifies any URL embedded multiple levels from the base URL, the number of levels being limited by a maximum-embedding depth.

19. The system of claim 14, wherein the URL-classification list further identifies URLs with unstable content that are embedded in the base URL.

* * * * *